US012691881B2

(12) United States Patent
Rawsky et al.

(10) Patent No.: US 12,691,881 B2
(45) Date of Patent: Jul. 28, 2026

(54) OBJECT DETECTION

(71) Applicant: Ford Global Technologies, LLC, Dearborn, MI (US)

(72) Inventors: Christopher Rawsky, Van Buren Township, MI (US); Pradeep Rajalingam, Woodhaven, MI (US); Jay Patel, Union City, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 31 days.

(21) Appl. No.: 18/752,912

(22) Filed: Jun. 25, 2024

(65) Prior Publication Data

US 2025/0388211 A1      Dec. 25, 2025

(51) Int. Cl.
B60W 30/18          (2012.01)

(52) U.S. Cl.
CPC . B60W 30/18163 (2013.01); B60W 2420/403 (2013.01); B60W 2420/408 (2024.01); B60W 2552/10 (2020.02); B60W 2554/4041 (2020.02); B60W 2554/4042 (2020.02); B60W 2554/4044 (2020.02); B60W 2554/4045 (2020.02)

(58) Field of Classification Search
CPC ..... B60W 30/18163; B60W 2420/403; B60W 2420/408; B60W 2552/10; B60W 2554/4041; B60W 2554/4042; B60W 2554/4044; B60W 2554/4045; B60W 30/0956
See application file for complete search history.

(56) References Cited

U.S. PATENT DOCUMENTS

| | | | |
|---|---|---|---|
| 6,683,560 | B2 | 1/2004 | Bauhahn |
| 9,159,023 | B2 | 10/2015 | Bone et al. |
| 11,017,671 | B2 | 5/2021 | Wong et al. |
| 2010/0228419 | A1 * | 9/2010 | Lee ..................... G05D 1/0246 701/25 |
| 2016/0137199 | A1 * | 5/2016 | Kühne .................. B60W 50/14 701/41 |
| 2018/0067496 | A1 | 3/2018 | Prasad et al. |
| 2018/0188735 | A1 * | 7/2018 | Sugawara ........... B60W 30/095 |
| 2021/0053570 | A1 * | 2/2021 | Akella ............ B60W 30/18163 |
| 2021/0300412 | A1 * | 9/2021 | Dingli ............... B60W 50/0098 |
| 2022/0009520 | A1 * | 1/2022 | Lindholm ......... B60W 60/0025 |
| 2024/0034312 | A1 * | 2/2024 | Dingli ................ B60W 60/001 |
| 2024/0409121 | A1 * | 12/2024 | Ohsugi ................ B60W 50/14 |

FOREIGN PATENT DOCUMENTS

| | | |
|---|---|---|
| FR | 3054673 A1 | 2/2018 |
| JP | 4561675 B2 | 10/2010 |

* cited by examiner

*Primary Examiner* — Jelani A Smith
*Assistant Examiner* — Alyssa Rorie
(74) *Attorney, Agent, or Firm* — Frank A. MacKenzie; Brooks Kushman P.C.

(57)          ABSTRACT

A computer that includes a processor and a memory, the memory including instructions executable by the processor to, upon initiating a lane change maneuver from a first lane to a second lane by a first vehicle including a first predicted trajectory, determine a second predicted trajectory for a second vehicle in a third lane based on one or more side-looking sensors. Based on determining that a distance between the first predicted trajectory and the second predicted trajectory is greater than a threshold, the first vehicle can be actuated to perform the lane change maneuver.

18 Claims, 5 Drawing Sheets

100

Server Computer
120

130

V-to-I Interface
111

Powertrain Controller
112

Brake Controller
113

Steering Controller
114

Computing Device
115

Sensors
116

Vehicle
110

OBJECT DETECTION

BACKGROUND

Computers can operate systems and devices including vehicles, robots, drones, and/or object tracking systems. Data including images can be acquired by sensors and processed by a computer to determine a location of a system with respect to an environment and with respect to objects in the environment. A computer may use the location data to determine one or more trajectories and/or actions for operating the system or components thereof in the environment.

DETAILED DESCRIPTION

Figure 1:
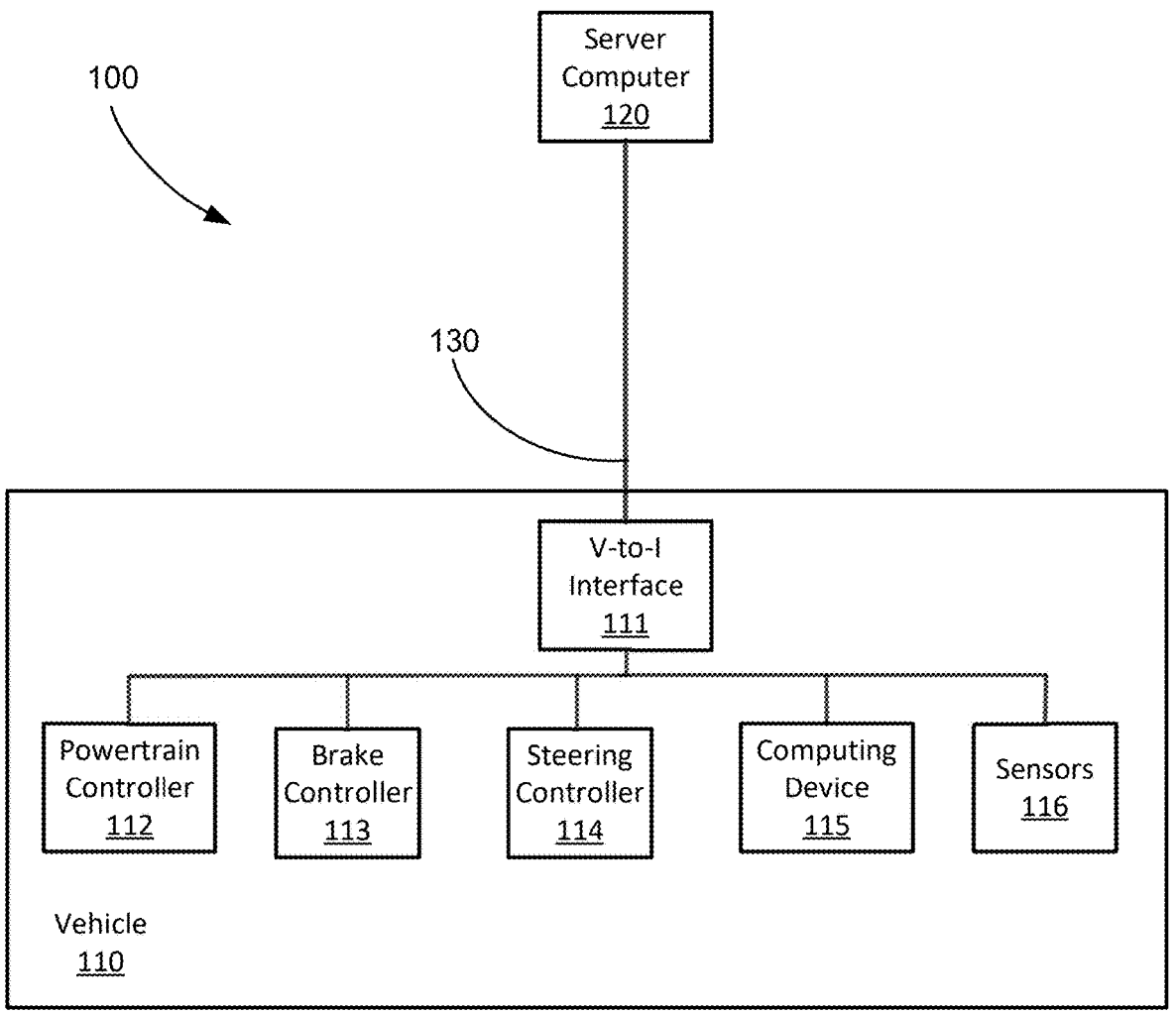
FIG. 1 is a block diagram of an example vehicle system.

Vehicles can be operated by a computer system that uses sensor data to detect objects in an environment around the vehicle. An example of vehicle operation that uses sensor data to detect objects is a computer system that performs a lane change maneuver. A lane change maneuver is a vehicle operation where a vehicle traveling in a traffic lane on a roadway moves into an adjacent lane, either to the left or right. A lane change maneuver can be initiated by a vehicle to pass a second vehicle traveling ahead of the vehicle in the same lane that may be stopped or traveling at a slower speed than the vehicle. A lane change maneuver can also be initiated by a vehicle to prepare for a left or right turn maneuver at some future time. A lane change maneuver can also be made in preparation for a left- or right-hand limited-access highway exits or splits.

A lane change maneuver can be initiated by a computer in a vehicle determining that changing lanes could be appropriate and/or useful. For example, a computer in the vehicle can determine that a second vehicle in the same lane is traveling more slowly than the vehicle is traveling. To maintain the vehicle's speed, a lane change maneuver can be initiated. A lane change maneuver can also be initiated by a vehicle occupant, for example by engaging a turn indicator to indicate which direction the lane change is desired.

When a lane change maneuver is initiated, a computer in the vehicle can determine a predicted trajectory for the vehicle as it performs the lane change maneuver. A predicted trajectory can be expressed according to a polynomial function that predicts the location, direction, and speed of the vehicle as the lane change maneuver is performed. Once the predicted trajectory is determined, the vehicle can acquire data from forward-looking and rearward-looking sensors included in the vehicle to determine whether any predicted trajectories for other vehicles on the roadway will interfere with the predicted trajectory for the vehicle. Interfere in this context means that the vehicles are predicted to come closer than a specified minimum distance at any time during the lane change maneuver.

In examples, the minimum distance between vehicles can be specified after being predetermined by vehicle manufactures to maintain prudent operation of a vehicle. Prudent operation includes not requiring immediate or rapid changes in vehicle direction or speed due to other vehicles or objects in an environment around a vehicle. The specified distance can be a function of the speed at which the vehicles are traveling, where greater vehicle speed indicates a greater distance between vehicles is warranted.

Techniques for lateral object detection as described herein can enhance lane change maneuvers by augmenting sensors such as forward-looking and rearward-looking sensors included in a vehicle with side-looking sensors that detect objects, including vehicles, in non-adjacent lanes. Non-adjacent lanes are traffic lanes separated from the lane in which the vehicle is traveling by one or more lanes. Forward- and rearward-facing sensors can detect vehicles in lanes adjacent to the vehicle and predict trajectories for them but cannot detect vehicles in non-adjacent lanes. Side-looking sensors can be used to detect a vehicle in a non-adjacent lane and based on a predicted trajectory, predict that a non-adjacent lane vehicle can enter an adjacent lane and interfere with a lane change maneuver. A side-looking sensor is a sensor that has a field of view that includes directions on one side or the other of a longitudinal axis of a vehicle, typically including directions at 90 degrees to the longitudinal axis of the vehicle. A side-looking sensor can be a radar or a camera, for example.

Side-looking sensors can include video sensors and radar sensors. Image data from video sensors can be processed by a computer included in a vehicle to detect objects including vehicles. Objects such as vehicles can be readily identified in image data and a two-dimensional (2D) location with respect to the video frame can be determined. Determining a three-dimensional (3D) location for an object in global coordinates is a more difficult task and can require multiple images and assumptions regarding a relationship between the object and a ground plane such as a roadway. Techniques that determine 3D locations of objects in image data can also require calibration based on intrinsic and extrinsic camera parameters. Intrinsic parameters include lens f-numbers, fields of view and sensor resolution. Extrinsic parameters include 3D location and orientation of the camera in global coordinates.

Radar sensors can return high resolution distance measurements for objects in the field of view of the radar sensor but can have low spatial resolution. Techniques described herein combine video data and radar data to provide high resolution 3D data regarding objects at lateral distances from a vehicle that include non-adjacent traffic lanes. Video data and radar data can be combined using image processing software techniques. An example library of image processing routines that can be used to detect and combine objects in video data and radar data can be found in the OpenCV image processing library. The OpenCV image processing library can be accessed at the website OpenCV.org, as of the filing data of this application.

For example, objects such as vehicles can be detected using the CascadeClassifier routine in OpenCV. The CascadeClassifier can be trained using a few hundred samples of images of the type of object to be detected. In the present context detected means to determine an identity of the object, a two-dimensional location of the object, and determine an outline of the object. CascadeClassifier works on both video images and radar images.

In example techniques, video data and radar data can be combined to determine a 3D location for an object using a neural network. A convolutional neural network (CNN) can be trained to input video and radar image data and output 3D locations in global coordinates relative to the location of the sensors, e.g., the location of the vehicle that includes the sensors. A CNN can be trained using a training dataset that includes corresponding pairs of video and radar images and ground truth data. Corresponding pairs of video and radar images are video and radar images that include the same object and are acquired at approximately the same time. Ground truth data is data that indicates the location of the object with respect to the sensors in global coordinates. Global coordinates can include x, y, and z location coordinates and roll, pitch, and yaw rotational coordinates measured with respect to a global coordinate system such as latitude, longitude, and altitude.

A CNN can include convolutional layers that perform convolutions on image data and fully-connected layers that perform algebraic calculations on latent variables output by the convolutional layers. A CNN is trained by processing image data from a training dataset multiple times while varying weights which govern the convolutions and algebraic calculations performed by the CNN to produce predictions based on the input image data. During training the output predictions can be compared to the ground truth data corresponding to the input image data to determine a loss function that indicates how closely the output prediction compares to the ground truth. By back-projecting the loss function through the CNN from output layers to input layers over the training dataset, a set of weights that minimizes the loss function over the training dataset can be selected to complete training of the CNN.

A trained CNN can receive as input a video image and a radar image acquired by side-looking sensors at approximately the same time, e.g., within less than one second and output a location for an object, which can be a vehicle, in global coordinates. The location of the object can be in x, y, and z position coordinates and yaw orientation coordinates. The roll and pitch coordinates are assumed to be zero because the object is assumed to be supported by the same roadway that supports the platform, e.g., a vehicle, that includes the video and radar sensors.

A computer included in a vehicle can determine a trajectory for an object in the field of view of side-looking sensors by acquiring multiple side-looking video images and multiple side-looking radar images at multiple time steps. Multiple object locations at multiple time steps can be determined and a curve can be fit to the multiple object locations that indicates the location, speed, and direction of the object with respect to the sensors. A Kalman filter is a technique that can be used to fit a curve to a series of data points to determine a location, speed, and direction for an object. For example, a vehicle location, speed, and direction of a vehicle in the based on processing side-looking video data and side-looking radar data can be extrapolated to predict a trajectory for the vehicle during the time for the planned lane change maneuver.

If the predicted trajectory would cause the object to occupy the same portion of the adjacent lane that was planned to be occupied by the vehicle during the lane change maneuver, the computer can cancel the lane change maneuver and plan a new trajectory for the vehicle. The new trajectory can keep the vehicle's location in the same traffic lane and slow down to maintain a user determined distance a leading vehicle in the same lane. If the predicted trajectory for the object does not cause the object to occupy the same portion of the adjacent lane that was planned to be occupied by the vehicle during the lane change maneuver, the lane change maneuver can be executed as planned.

An additional possible technique for predicting a trajectory for a vehicle in the field of view of side-looking sensors includes processing video images with an image processing software program as described above to determine that a turn indicator light on the vehicle is blinking. A blinking turn indicator light can indicate that the vehicle is planning to enter the adjacent lane and potentially interfere with the planned lane change maneuver. When a front or rear flashing turn indicator is detected, a trajectory can be predicted that assumes the vehicle will enter the adjacent lane and, if the predicted trajectory indicates that the other vehicle might interfere with the planned lane change maneuver, the lane change maneuver can be canceled.

Doppler radar is another technology that can be used to predict a trajectory for a vehicle in the field of view of side-looking sensors. Based on side-looking Doppler radar data, also referred to herein as side-looking Doppler radar images, a speed at which an object is moving toward or away from a radar sensor can be determined. Combined with side-looking video data, side-looking Doppler radar data can enhance the determination of location, speed, and direction by requiring fewer images to determine a trajectory for the object.

Disclosed herein is a method, including, upon initiating a lane change maneuver from a first lane to a second lane by a first vehicle including a first predicted trajectory, determining a second predicted trajectory for a second vehicle in a third lane based on one or more side-looking sensors and, based on determining that a distance between the first predicted trajectory and the second predicted trajectory is greater than a threshold, actuating the first vehicle to perform the lane change maneuver. Performing the lane change maneuver can include operating the first vehicle on the first predicted trajectory. When the distance between the first predicted trajectory and the second predicted trajectory is less than the threshold, the lane change maneuver can be cancelled. Cancelling the lane change maneuver can include determining a third predicted trajectory for the first vehicle. Cancelling the lane change maneuver can include operating the first vehicle on the third predicted trajectory. The lane change maneuver can be initiated based on one or more of detecting a leading vehicle traveling more slowly in the same traffic lane as the first vehicle and a user indicating a lane change maneuver request.

The second predicted trajectory can be determined by a software program included in the first vehicle based on acquiring multiple side-looking video images and multiple side-looking radar images and determining a second vehicle location, speed, and direction. A second vehicle location, speed, and direction can be determined based on processing side-looking video data and side-looking radar data with a neural network. A second vehicle location, distance, and speed can be determined based on processing side-looking video data and side-looking radar data with image processing software. The distance from the first vehicle to the second vehicle can be determined based on side-looking Doppler radar data. Determining the trajectory for the second vehicle can be based on detecting a flashing turn indicator on the second vehicle. Performing the lane change maneuver can include operating the first vehicle by actuating vehicle components via controllers. The third trajectory can include keeping the first vehicle in the first lane. Keeping the first vehicle in the first lane can include adjusting vehicle speed to maintain a specified distance from a leading vehicle.

Further disclosed is a computer readable medium, storing program instructions for executing some or all of the above method steps. Further disclosed is a computer programmed for executing some or all of the above method steps, including a computer apparatus, programmed to, upon initiating a lane change maneuver from a first lane to a second lane by a first vehicle including a first predicted trajectory, determine a second predicted trajectory for a second vehicle in a third lane based on one or more side-looking sensors and, based on determining that a distance between the first predicted trajectory and the second predicted trajectory is greater than a threshold, actuate the first vehicle to perform the lane change maneuver. Performing the lane change maneuver can include operating the first vehicle on the first predicted trajectory. When the distance between the first predicted trajectory and the second predicted trajectory is less than the threshold, the lane change maneuver can be cancelled. Cancelling the lane change maneuver can include determining a third predicted trajectory for the first vehicle. Cancelling the lane change maneuver can include operating the first vehicle on the third predicted trajectory. The lane change maneuver can be initiated based on one or more of detecting a leading vehicle traveling more slowly in the same traffic lane as the first vehicle and a user indicating a lane change maneuver request.

The instructions can include instructions to determine the second predicted trajectory by a software program included in the first vehicle based on acquiring multiple side-looking video images and multiple side-looking radar images and determining a second vehicle location, speed, and direction. A second vehicle location, speed, and direction can be determined based on processing side-looking video data and side-looking radar data with a neural network. A second vehicle location, distance, and speed can be determined based on processing side-looking video data and side-looking radar data with image processing software. The distance from the first vehicle to the second vehicle can be determined based on side-looking Doppler radar data. Determining the trajectory for the second vehicle can be based on detecting a flashing turn indicator on the second vehicle. Performing the lane change maneuver can include operating the first vehicle by actuating vehicle components via controllers. The third trajectory can include keeping the first vehicle in the first lane. Keeping the first vehicle in the first lane can include adjusting vehicle speed to maintain a specified distance from a leading vehicle.

FIG. 1 is a diagram of a vehicle computing system 100. Vehicle computing system 100 includes a vehicle 110, a computing device 115 included in the vehicle 110, and a server computer 120 remote from the vehicle 110. One or more vehicle 110 computing devices 115 can receive data regarding the operation of the vehicle 110 from sensors 116. The computing device 115 may operate vehicle 110 based on data received from the sensors 116 and data received from the remote server computer 120. The server computer 120 can communicate with the vehicle 110 via a network 130.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle propulsion (i.e., control of speed in the vehicle 110 by controlling one or more of an internal combustion engine, electric motor, hybrid engine, etc.), steering, climate control, interior and exterior lights, etc., as well as to determine whether and when the computing device 115, as opposed to a human operator, is to control such operations. The computing device 115 can also control the temporal alignment of lighting to sensor acquisition to account for the color effects of vehicle lights or external lights.

The computing device 115 may include or be communicatively coupled to, i.e., via a vehicle communications bus as described further below, more than one computing devices, i.e., controllers or the like included in the vehicle 110 for monitoring and controlling various vehicle components, i.e., a propulsion controller 112, a brake controller 113, a steering controller 114, etc. The computing device 115 is generally arranged for communications on a vehicle communication network, i.e., including a bus in the vehicle 110 such as a controller area network (CAN) or the like; the vehicle 110 network can additionally or alternatively include wired or wireless communication mechanisms such as are known, i.e., Ethernet or other communication protocols.

Via the vehicle network, the computing device 115 may transmit messages to various devices in vehicle 110 and receive messages from the various devices, i.e., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V2I) interface 111 with a remote server computer 120, i.e., a cloud server, via a network 130, which, as described below, includes hardware, firmware, and software that permits computing device 115 to communicate with a remote server computer 120 via a network 130 such as wireless Internet (WI-FI®) or cellular networks. V2X interface 111 may accordingly include processors, memory, transceivers, etc., configured to utilize various wired and wireless networking technologies, i.e., cellular, BLUETOOTH®, Bluetooth Low Energy (BLE), Ultra-Wideband (UWB), Peer-to-Peer communication, UWB based Radar, IEEE 802.11, and other wired and wireless packet networks or technologies. Computing device 115 may be configured for communicating with other vehicles 110 through V2X (vehicle-to-everything) interface 111 using vehicle-to-vehicle (V-to-V) networks, i.e., according to including cellular communications (C-V2X) wireless communications cellular, Dedicated Short Range Communications (DSRC) and the like, i.e., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V2I) interface 111 to a server computer 120 or user mobile device 160.

As already mentioned, generally included in instructions stored in the memory and executable by the processor of the computing device 115 is programming for operating one or more vehicle 110 components, i.e., steering, propulsion, etc., without intervention of a human operator. Using data received in the computing device 115, i.e., the sensor data from the sensors 116, the server computer 120, etc., the computing device 115 may make various determinations and control various vehicle 110 components and operations. For example, the computing device 115 may include programming to control vehicle 110 operational behaviors (i.e., physical manifestations of vehicle 110 operation) such as speed, steering, etc., as well as tactical behaviors (i.e., control of operational behaviors typically in a manner intended to achieve efficient traversal of a route) such as a distance between vehicles and amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and control a specific vehicle subsystem. Examples include a propulsion controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions.

The one or more controllers 112, 113, 114 for the vehicle 110 may include known electronic control units (ECUs) or the like including, as non-limiting examples, one or more propulsion controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices such as are known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and other sensors 116 and the geographical coordinates provided by the GPS sensor may be used by the computing device 115 to operate the vehicle 110 autonomously or semi-autonomously, for example.

The vehicle 110 is generally a land-based vehicle 110 capable of autonomous and semi-autonomous operation and having three or more wheels, i.e., a passenger car, light truck, etc. Vehicle 110 includes one or more sensors 116, the V2I interface 111, the computing device 115 and one or more controllers 112, 113, 114. Sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, oil pressure, the power amount applied to controllers 112, 113, 114 in the vehicle 110, connectivity between components, and accurate and timely performance of components of the vehicle 110.

Server computer 120 typically has features in common, e.g., a computer processor and memory and configuration for communication via a network 130, with the vehicle 110 V2I interface 111 and computing device 115, and therefore these features will not be described further to reduce redundancy. A server computer 120 can be used to develop and train software that can be transmitted to a computing device 115 in a vehicle 110.

Figure 2:
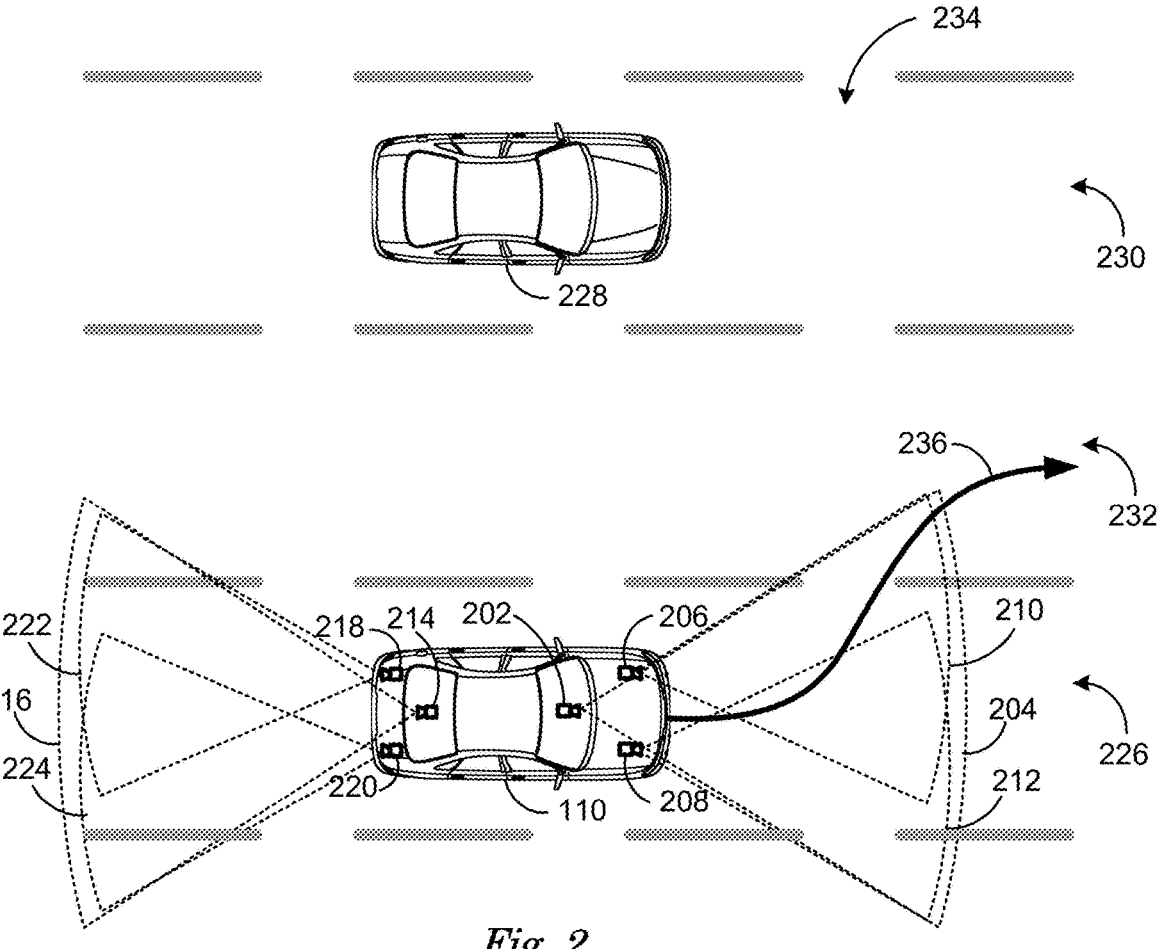
FIG. 2 is a diagram of an example vehicle including sensors.

FIG. 2 is a diagram of vehicle 110 traveling on roadway 234. Vehicle 110 is traveling in a first traffic lane 226. Adjacent to the first traffic lane is a second traffic lane 232 and beyond second traffic lane is a non-adjacent third traffic lane 230. A second vehicle 228 is traveling in the same direction as vehicle 110 in the third traffic lane. Vehicle 110 is equipped with sensors 116 including a forward-looking video camera 202 having a forward-looking field of view 204 and two forward-looking radar sensors 206, 208 having two forward-looking fields of view 210, 212, respectively. Vehicle 110 also is equipped with a rearward-looking video camera 214 having a rearward-looking field of view 216 and two rearward-looking radar sensors 218, 220 having rearward-looking fields of view 222, 224, respectively.

Forward-looking video camera 202 and forward-looking radar sensors 206, 208 and rearward-looking video camera 214 and rearward-looking radar sensors 218, 220 can assist vehicle 110 in initiating and performing a lane change maneuver. For example, forward-looking sensors video camera 202 and forward-looking radar sensors 206, 208 can acquire data that can be used by computing device 115 to determine that a vehicle in the first traffic lane 226 traveling ahead of vehicle 110 is traveling more slowly than vehicle 110, which would require vehicle 110 to slow down if vehicle 110 remained in the first traffic lane 226. As an alternative, vehicle 110 can initiate a lane change maneuver.

Computing device 115 can determine that a second traffic lane 232 exists adjacent to the first traffic lane 226 that vehicle 110 is traveling in. Computing device 115 can determine the existence of the second traffic lane 232 by recalling map data from memory included in computing device 115 or downloaded from the Internet via network 130, for example GOOGLE™ maps. Computing device 115 can confirm the existence of the second traffic lane 232 by acquiring image data from forward-looking video camera 202 and forward-looking radar sensors 206, 208 and rearward-looking video camera 214 and rearward-looking radar sensors 218, 220.

Computing device 115 can then determine a predicted trajectory 236 which would accomplish the lane change maneuver while maintaining limits on minimum and maximum rates of change of vehicle lateral and longitudinal position. Once the predicted trajectory 236 is determined, computing device 115 can acquire data from forward-looking video camera 202 and forward-looking radar sensors 206, 208 and rearward-looking video camera 214 and rearward-looking radar sensors 218, 220 to determine the locations, speed, and direction of any vehicles that might occupy the second traffic lane 232. Trajectories can be determined for any vehicles that occupy the second traffic lane 232 to prevent any vehicles from interfering with the lane change maneuver by coming closer to the space defined by the predicted trajectory 236 than a user-defined distance. The user-defined distance can vary with the speed of the vehicle 110, with a smaller distance being required at slow speeds and a greater distance at higher speeds. For example, parking, where vehicle 110 is moving at less than five kilometers per hour (kph) only one meter might be required, while at highway speeds of 100 kph a distance of 60 meters can be required.

In examples where vehicles are detected in the second traffic lane 232 that would interfere with vehicle 110 at any point during the lane change maneuver by coming closer than the specified distance based on predicted trajectories for the vehicles, the lane change maneuver can be cancelled and a new trajectory for vehicle 110 can be determined. The new trajectory would keep vehicle 110 in the first traffic lane 226 and adjust vehicle 110 speed to maintain the specified distance from a leading vehicle in the first traffic lane 226. If no interfering vehicles in the second traffic lane 232 are detected, the lane change maneuver can be performed by computing device 115 by operating vehicle 110 along the predicted trajectory 236.

While forward-looking video camera 202 and forward-looking radar sensors 206, 208 and rearward-looking video camera 214 and rearward-looking radar sensors 218, 220 are effective in detecting vehicle in an adjacent, second traffic lane 232, a vehicle 228 traveling in a non-adjacent third traffic lane 230 can be undetected by forward-looking video camera 202 and forward-looking radar sensors 206, 208 and rearward-looking video camera 214 and rearward-looking radar sensors 218, 220. Due to the lateral distance between vehicle 110 in a first traffic lane 226 and vehicle 228 in a non-adjacent third traffic lane 230, vehicle 228 may go undetected by computing device 115 in vehicle 110. In some examples vehicle 228 will stay in the third traffic lane 230 for the duration of the lane change maneuver and will not interfere with the planned lane change maneuver.

In some examples, however, vehicle 228 can choose to enter second traffic lane 232 after a lane change maneuver has been initiated by vehicle 110. In examples where vehicle 228 chooses to enter the second traffic lane 232 after a lane change maneuver has been initiated by vehicle 110, vehicle 228 can be undetected by computing device 115 in vehicle 110 until vehicle 228 enters a field of view 204, 210, 212, 216, 222, 224 of one of the sensors 116 of vehicle 110. When vehicle 228 enters a field of view 204, 210, 212, 216, 222, 224 of one of the sensors 116 of vehicle 110 the distance between vehicle 228 and vehicle 110 can be less than the specified distance required between vehicles, which can require that vehicle 110 cancel the lane change maneuver and operate the vehicle 110 in a fashion that exceeds the normal limits on rates of change in lateral and longitudinal speed and direction.

Figure 3:
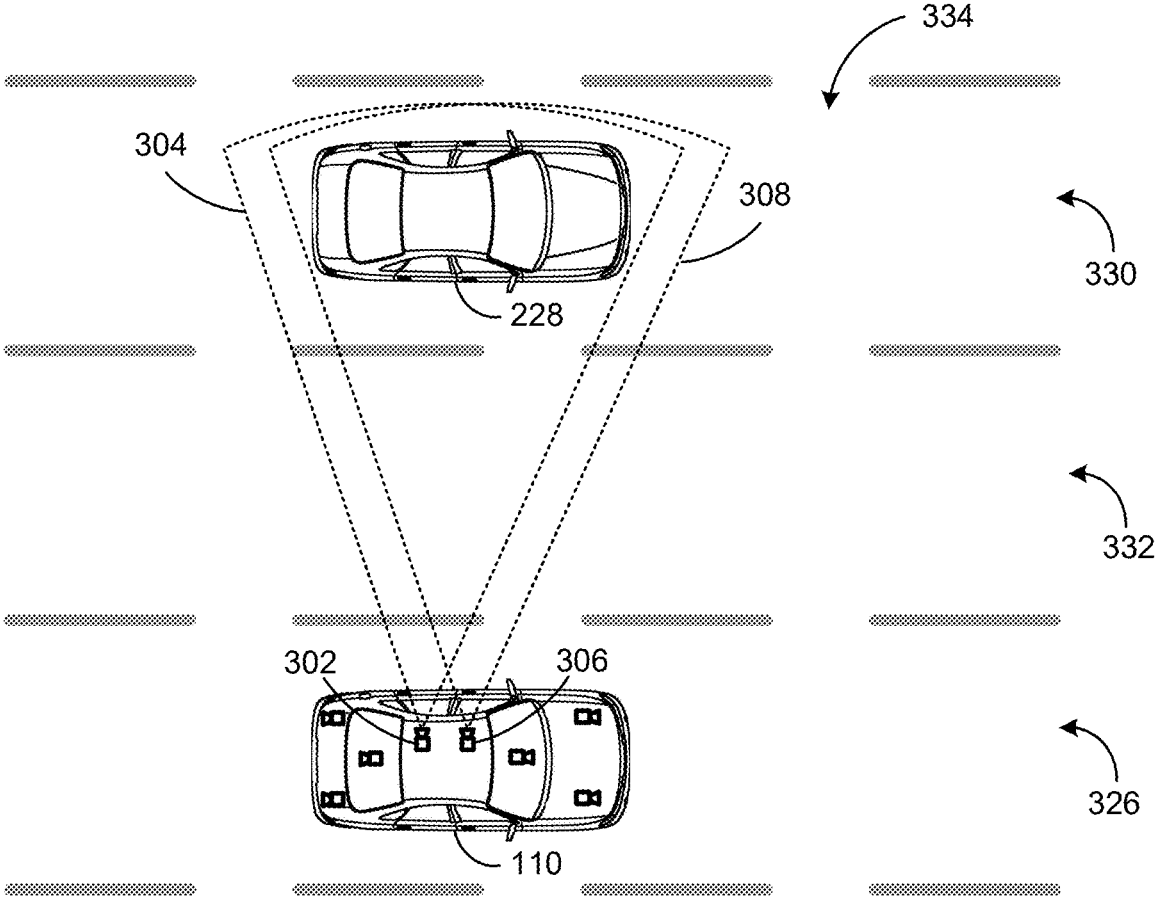
FIG. 3 is a diagram of an example vehicle including side-looking sensors.

FIG. 3 is a diagram of vehicle 110 traveling on roadway 334 having a first traffic lane 326, a second traffic lane 332 and a third traffic lane 330 that includes a second vehicle 228. Vehicle 110 includes a side-looking video camera 302 having a side-looking field of view 304 and a side-looking radar sensor 306 having a side-looking field of view 308 in addition to forward-looking video camera 202 and forward-looking radar sensors 206, 208 and rearward-looking video camera 214 and rearward-looking radar sensors 218, 220 as illustrated in FIG. 2. Vehicle 110 can also include a side-looking video camera 302 and a side-looking radar sensor 306 on the right side of vehicle 110 with side-looking fields of view 304, 308 pointing to the right of vehicle 110. Vehicle 110 can also include more than one of each type of sensor pointing in each direction.

Side-looking video camera 302 and side-looking radar sensor 306 can permit a software program executing on computing device 115 to determine a location, speed, and direction for second vehicle 228. When a lane change maneuver for vehicle 110 is initiated by computing device 115, side-looking video data, also referred to herein as video images, and side-looking radar data, also referred to herein as radar images, can be acquired from side-looking video camera 302 and side-looking radar sensor 306. Computing device 115 can determine a trajectory for second vehicle 228 and, based on the trajectory, generate a predicted trajectory for second vehicle 228.

Figure 4:
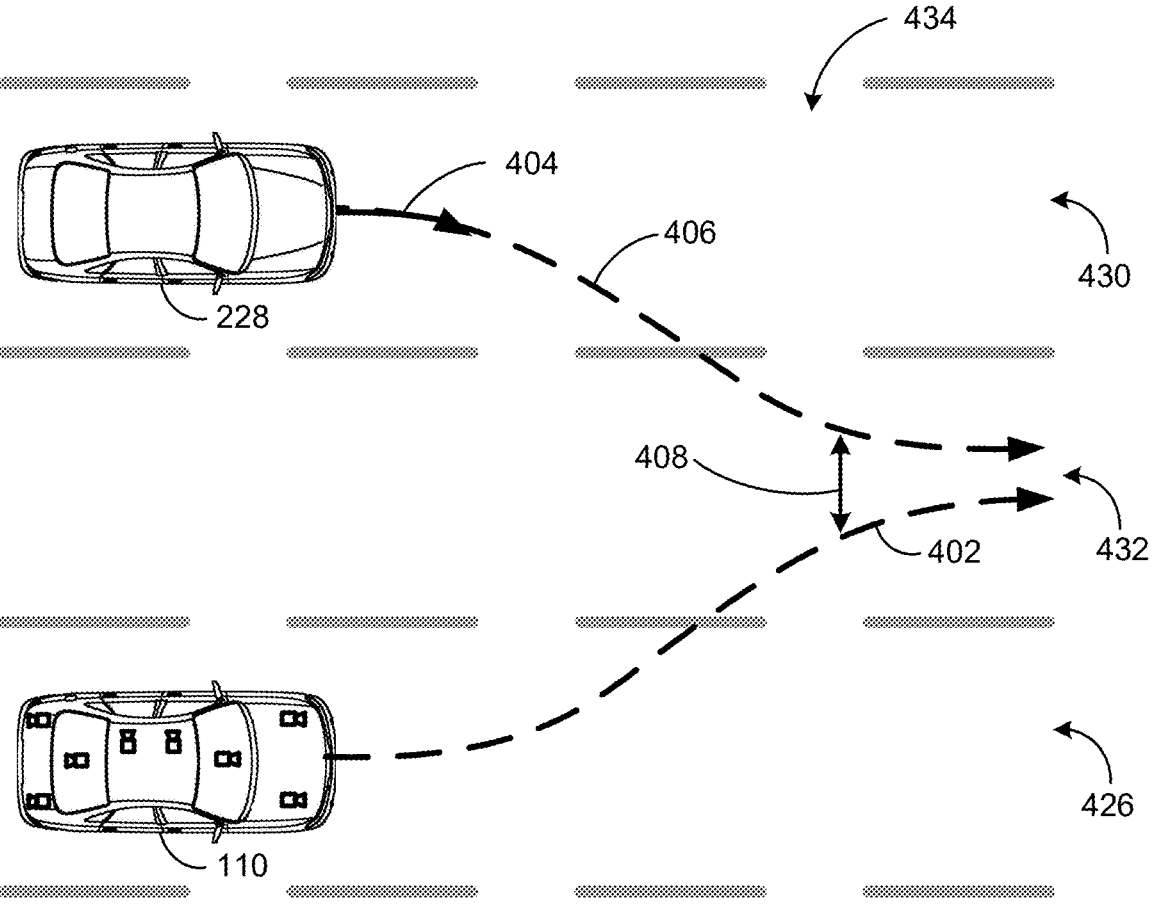
FIG. 4 is a diagram of an example vehicle initiating a lane change maneuver with a second vehicle on the roadway.

FIG. 4 is a diagram of vehicle 110 traveling on roadway 434 having a first traffic lane 426, a second traffic lane 432 and a third traffic lane 430 that includes second vehicle 228. Vehicle 110 includes a side-looking video camera 302 and a side-looking radar sensor 306 as illustrated in FIG. 2 in addition to forward-looking video camera 202 and forward-looking radar sensors 206, 208 and rearward-looking video camera 214 and rearward-looking radar sensors 218, 220 as illustrated in FIG. 2.

Computing device 115 in vehicle 110 has initiated a lane change maneuver that includes directing vehicle 110 to travel from first traffic lane 426 to second traffic lane 432. As part of initiating a lane change maneuver, computing device can determine a predicted trajectory 402 for vehicle 110. In addition, as part of initiating the lane change maneuver, computing device 115 can acquire video images and radar images from side-looking video camera 302 and a side-looking radar sensor 306.

Based on the acquired video images and radar images, computing device 115 can determine a trajectory 404 for second vehicle 228. Based on the determined trajectory 404, computing device can determine a predicted trajectory 406 that anticipates future locations for second vehicle 228. Based on the predicted trajectory 402 for vehicle 110 and the predicted trajectory 406 for second vehicle 228, computing device 115 can whether, at any time during the lane change maneuver, the distance 408 between vehicle 110 and second vehicle 228 is less than a specified distance (i.e., a distance threshold). As discussed above, the threshold can be predetermined to prevent immediate or rapid changes in vehicle speed or direction being required by other vehicles or objects in an environment around a vehicle. When the distance 408 between the second vehicle 228 and the vehicle 110 is predicted to be less than the specified threshold, the lane change maneuver can be canceled. When the distance 408 between the second vehicle 228 and the vehicle 110 is predicted to be greater than the specified threshold for the duration of the lane change maneuver, the lane change maneuver computing device 115 can perform the lane change maneuver.

The predetermined threshold can be selected to cancel the lane change maneuver whenever second vehicle 228 is predicted to enter the adjacent, second traffic lane at any time during the lane change maneuver, for example. In other examples, the specified threshold can be selected to be four meters, or about the width of a typical traffic lane in the United States.

Figure 5:
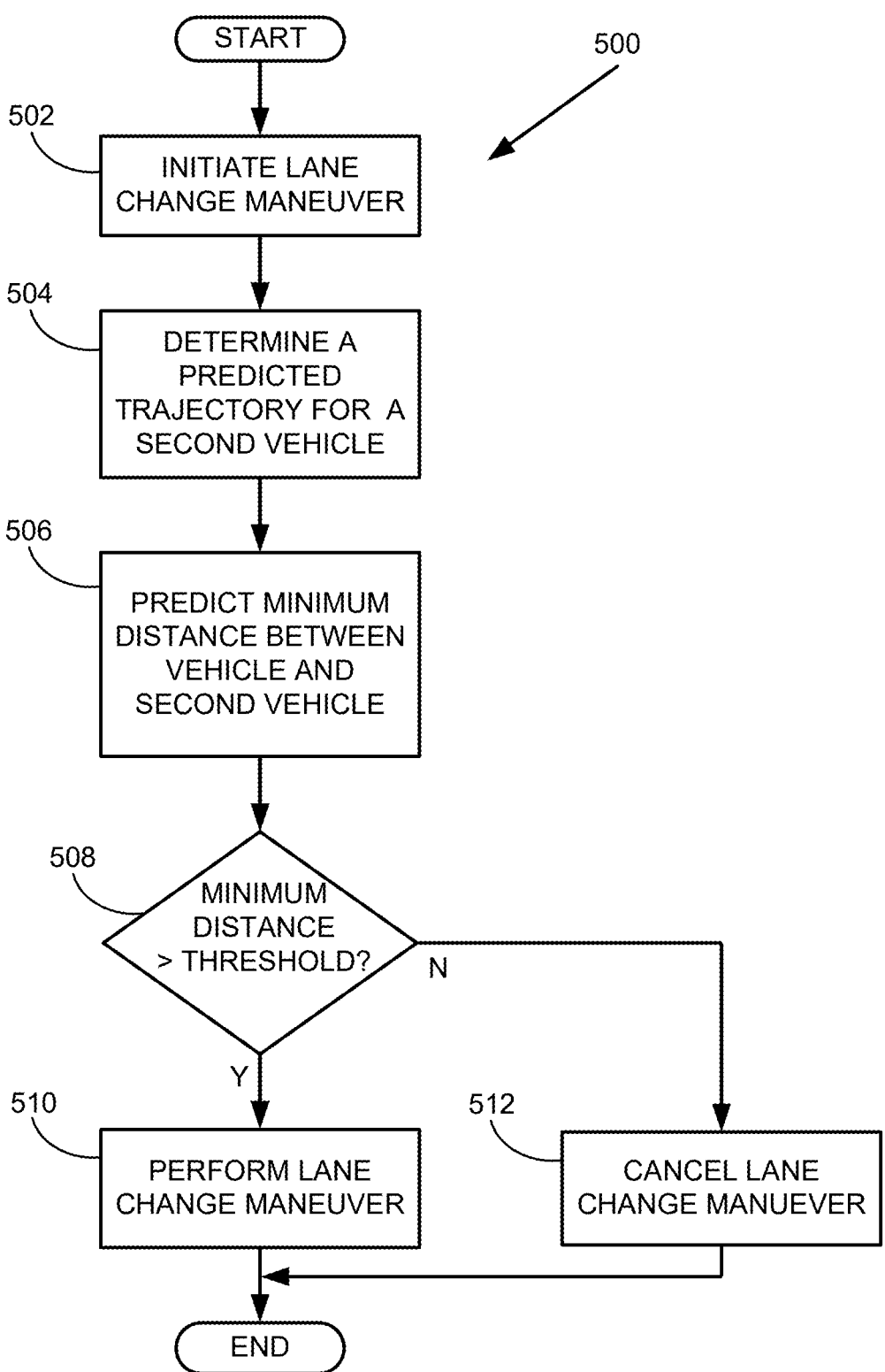
FIG. 5 is a flowchart diagram of an example process to determine when a second vehicle is entering a second lane.

FIG. 5 is a flowchart of a process 500 for performing a lane change maneuver based on side-looking video camera and radar sensor data. Process 500 can be implemented in a computing device 115, for example. Process 500 includes multiple blocks that can be executed in the illustrated order. Process 500 could alternatively or additionally include fewer blocks and can include the blocks executed in different orders.

Process 500 begins at block 502, where computing device 115 in a vehicle 110 initiates a lane change maneuver. The lane change maneuver can be requested by computing device 115 based on maintaining a desired speed despite a leading vehicle traveling in the traffic lane occupied by the vehicle or based on a lane change maneuver request initiated by a user manually activating a turn signal or other switch. As discussed above, initiating a lane change maneuver can include acquiring forward-looking sensor data and rearward-looking sensor data from forward-looking video camera 202 and forward-looking radar sensors 206, 208 and rearward-looking video camera 214 and rearward-looking radar sensors 218, 220 to determine that there are no vehicles in an adjacent traffic lane that would impede the ability of vehicle 110 to perform a lane change maneuver. Computing device 115 can determine a predicted trajectory 402 for vehicle 110 and may use location, speed, and direction data determined based on forward-looking sensor data and rearward-looking sensor data to determine that no vehicles will come closer than a predetermined threshold to vehicle 110 during the lane change maneuver.

At block 504 the computer 115 can acquire side-looking video data and side looking radar data from side-looking video cameras 302 and side-looking radar sensor 306. In examples where a second vehicle 228 is visible in side-looking video data and side-looking radar data, computing device 115 can determine a trajectory 404 for the second vehicle 228 and use the trajectory 404 to determine a predicted trajectory 406 for the second vehicle.

At block 506 computing device 115 can predict a minimum distance between the predicted trajectory 402 for vehicle 110 and the predicted trajectory 404 for second vehicle 110 during the planned lane change maneuver, At block 508 computing device 115 can compare the predicted minimum distance between the predicted trajectory 402 for vehicle 110 and the predicted trajectory 404 for second vehicle 110 to a specified threshold. In examples of lane change maneuver techniques, the specified threshold can be met when a second vehicle 228 enters the adjacent, second traffic lane that is planned to be occupied by vehicle 110 performing the lane change maneuver. When the minimum distance is greater than the threshold process 500 passes to block 510 and when the minimum distance is less than the threshold process 500 passes to block 512.

At block 510 computing device 115 directs vehicle 110 to perform the lane change maneuver by operating the vehicle 110 along the predicted trajectory 402 by actuating vehicle components via controllers 112, 113, 114.

At block 512 computing device 115 actuates the vehicle 110 to cancel the planned lane change maneuver. Cancelling the lane change maneuver includes determining a new predicted trajectory that includes keeping vehicle 110 in the current, first traffic lane and adjusting vehicle 110 speed to maintain a specified distance from a leading vehicle, if present. Following block 512 process 500 ends.

Any action taken by a vehicle or user of the vehicle in response to one or more navigation prompts disclosed herein should comply with all rules specific to the location and operation of the vehicle (e.g., Federal, state, country, city, etc.). More so, any navigation prompts disclosed herein are for illustrative purposes only. Certain navigation prompts may be modified and omitted depending on the context, situation, and applicable rules. Further, regardless of the navigation prompts, users should use good judgement and common sense when operating the vehicle. That is, all navigation prompts, whether standard or "enhanced," should be treated as suggestions and only followed when permitted to do so and when in compliance with any rules specific to the location and operation of the vehicle.

Computing devices such as those described herein generally each includes commands executable by one or more computing devices such as those identified above, and for carrying out blocks or steps of processes described above. For example, process blocks described above may be embodied as computer-executable commands.

Computer-executable commands may be compiled or interpreted from computer programs created using a variety of programming languages and technologies, including, without limitation, and either alone or in combination, Java™, C, C++, Python, Julia, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a candidate to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:
1. A system, comprising:

a computer that includes a processor and a memory, the memory including instructions executable by the processor to:

upon initiating a lane change maneuver from a first lane to a second lane by a first vehicle including a first predicted trajectory, determine a second predicted trajectory for a second vehicle in a third lane based on one or more side-looking video images and side-looking Doppler radar images having overlapping fields of view; and based on determining that a distance between the first predicted trajectory and the second predicted trajectory is greater than a threshold, actuate the first vehicle to perform the lane change maneuver.

2. The system of claim 1, wherein performing the lane change maneuver includes operating the first vehicle on the first predicted trajectory.

3. The system of claim 1, wherein, when the distance between the first predicted trajectory and the second predicted trajectory is less than the threshold, cancel the lane change maneuver.

4. The system of claim 3, wherein cancelling the lane change maneuver includes determining a third predicted trajectory for the first vehicle.

5. The system of claim 4, wherein cancelling the lane change maneuver includes operating the first vehicle on the third predicted trajectory.

6. The system of claim 1, wherein the lane change maneuver is initiated based on one or more of detecting a leading vehicle traveling more slowly in the same traffic lane as the first vehicle and a user indicating a lane change maneuver request.

7. The system of claim 1, wherein a second vehicle location, speed, and direction are determined based on processing side-looking video data and side-looking radar data with a neural network.

8. The system of claim 1, wherein a second vehicle location, distance, and speed are determined based on processing side-looking video data and side-looking radar data with image processing software.

9. The system of claim 1, wherein determining the trajectory for the second vehicle is based on detecting a flashing turn indicator on the second vehicle.

10. A method, comprising:

upon initiating a lane change maneuver from a first lane to a second lane by a first vehicle including a first predicted trajectory, determining a second predicted trajectory for a second vehicle in a third lane based on one or more side-looking video images and side-looking Doppler radar images having overlapping fields of view; and based on determining that a distance between the first predicted trajectory and the second predicted trajectory is greater than a threshold, actuating the first vehicle to perform the lane change maneuver.

11. The method of claim 10, wherein performing the lane change maneuver includes operating the first vehicle on the first predicted trajectory.

12. The method of claim 10, wherein, when the distance between the first predicted trajectory and the second predicted trajectory is less than the threshold, cancel the lane change maneuver.

13. The method of claim 12, wherein cancelling the lane change maneuver includes determining a third predicted trajectory for the first vehicle.

14. The method of claim 13, wherein cancelling the lane change maneuver includes operating the first vehicle on the third predicted trajectory.

15. The method of claim 10, wherein the lane change maneuver is initiated based on one or more of detecting a leading vehicle traveling more slowly in the same lane as the first vehicle and a user indicating a lane change maneuver request.

16. The method of claim 10, wherein a second vehicle location, speed, and direction are determined based on processing side-looking video data and side-looking radar data with a neural network.

17. The method of claim 10, wherein a second vehicle location, distance, and speed are determined based on processing side-looking video data and side-looking radar data with image processing software.

18. The method of claim 10, wherein determining the trajectory for the second vehicle is based on detecting a flashing turn indicator on the second vehicle.

* * * * *